Nov. 13, 1956 G. E. RYCKMAN 2,770,214
CUP HANDLE STROKING MACHINE
Filed Oct. 31, 1955 3 Sheets-Sheet 1
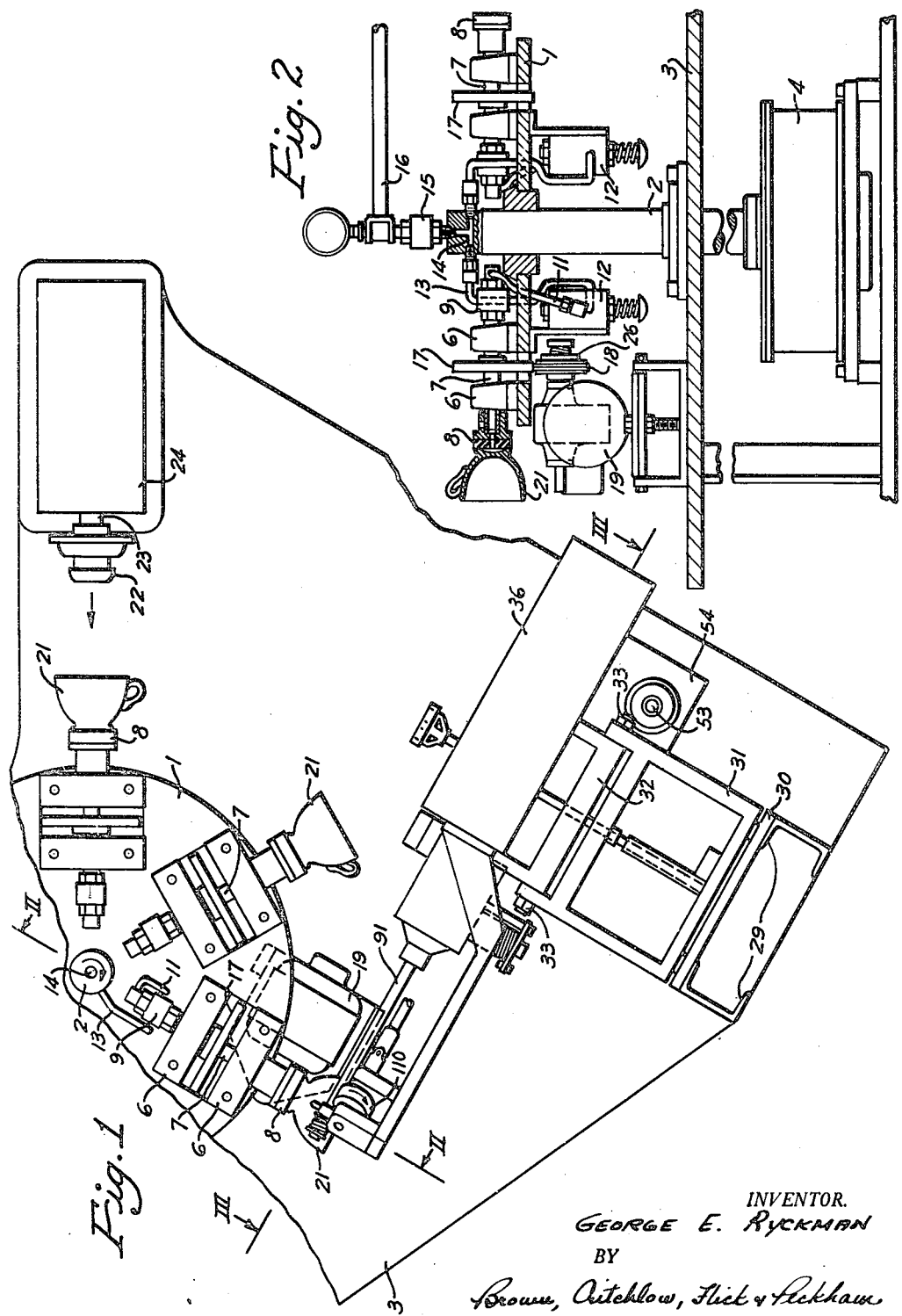
INVENTOR.
GEORGE E. RYCKMAN
BY
Brown, Critchlow, Flick & Peckham
His ATTORNEYS

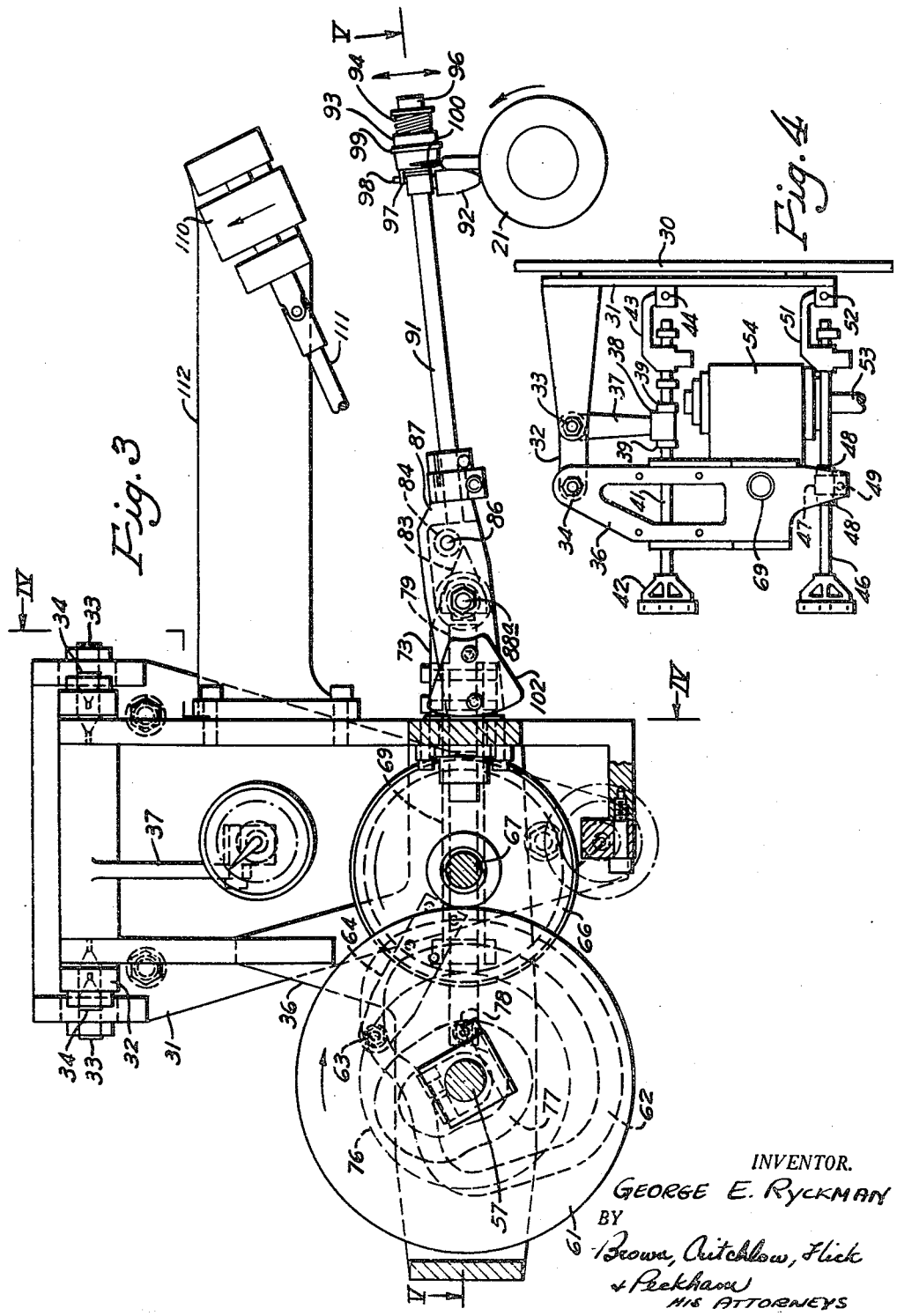

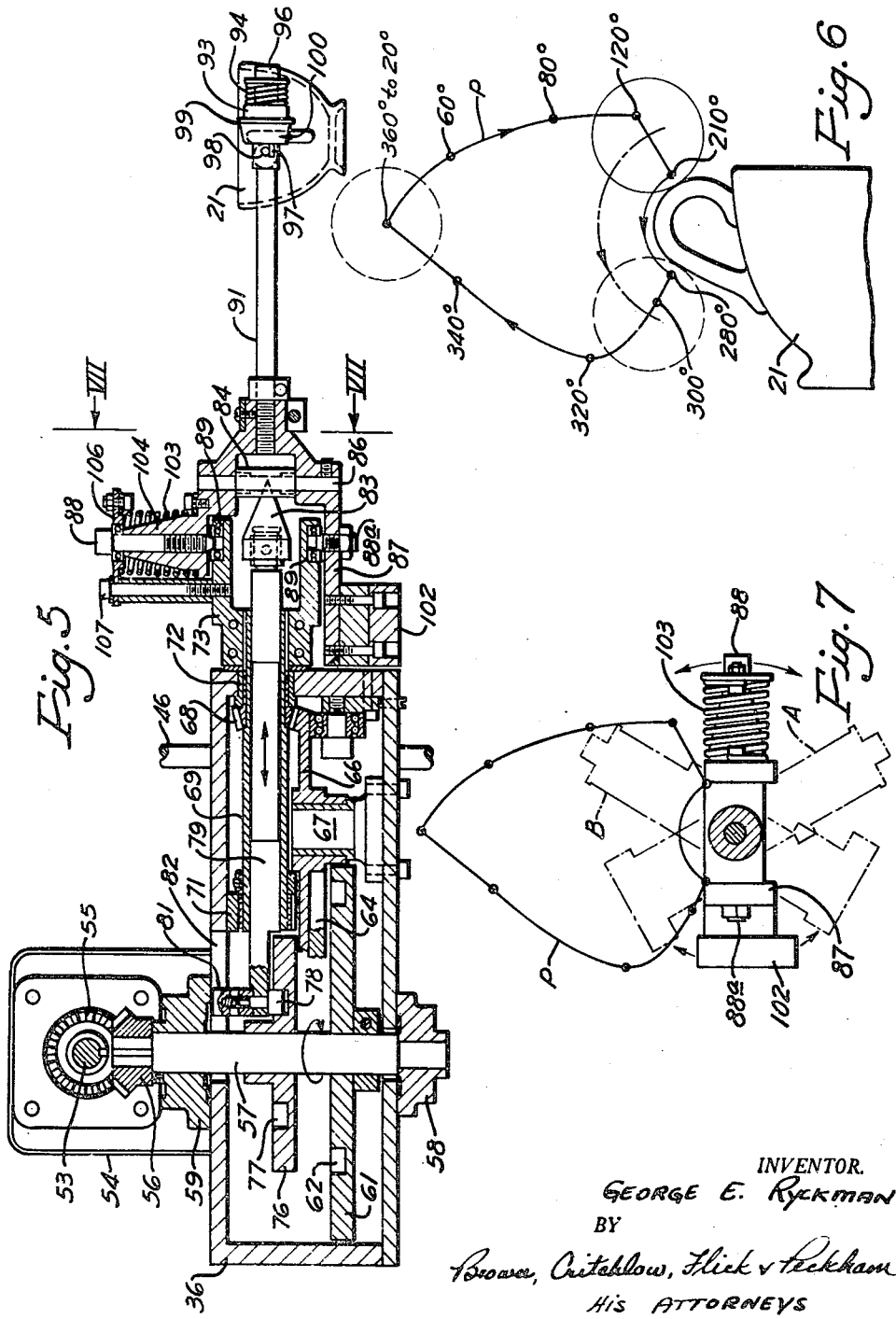

United States Patent Office 2,770,214
Patented Nov. 13, 1956

2,770,214
CUP HANDLE STROKING MACHINE

George E. Ryckman, East Liverpool, Ohio, assignor to The Homer Laughlin China Company, Newell, W. Va., a corporation of Delaware Application October 31, 1955, Serial No. 543,674

11 Claims. (Cl. 118—242)

This invention relates to machines for painting or printing lines or strokes on the handles of cups.

It is common practice to paint a short, wide gold line along the outermost surface of a cup handle. Such a line is generally referred to as a stroke, and in the past it has been done manually with a brush. Considerable skill is required in order to properly position the strokes on cup handles and to make them as uniform in appearance as possible. Stroking cup handles by hand is slow and many cups cannot be sold as "firsts" because the strokes were not applied accurately enough.

It is among the objects of this invention to provide a machine which automatically applies strokes to cup handles, which is fully adjustable for cups and handles of different sizes, which is rapid in operation, which accurately and uniformly applies the strokes to cup after cup, and which can be operated by unskilled labor.

The preferred embodiment of this invention is illustrated in the accompanying drawings, in which:

Fig. 1 is a fragmentary plan view of my machine;
Fig. 2 is a vertical section taken on the line II—II of Fig. 1;
Fig. 3 is an enlarged view, partly broken away, taken approximately on the line III—III of Fig. 1;
Fig. 4 is a reduced vertical section taken on the line IV—IV of Fig. 3;
Fig. 5 is a horizontal section taken on the line V—V of Fig. 3;
Fig. 6 is a diagram showing the path of travel of the applicator; and
Fig. 7 is a cross section taken on the line VII—VII of Fig. 5.

Referring to Figs. 1 and 2 of the drawings, a horizontal table 1 is rigidly mounted on the upper part of a vertical shaft 2, which is journaled in a base plate 3, mounted on a suitable foundation. The lower end of the shaft extends into a Geneva drive mechanism 4 so that the table can be rotated intermittently to index it from station to staion. Mounted on the table a circumferenially spaced points are pairs of bearings 6 in which hollow radial shafts 7 are journaled. A resilient chuck 8 is mounted on the outer end of each shaft and is provided with a central passage. The opposite end of the shaft is journaled in a sealing member 9 connected by a tube 11 to a three-way valve 12, which is connected by another tube 13 to a radial opening 14 in the upper end of the table shaft. The several radial openings in this shaft are joined with an axial opening which is connected by a rotary seal 15 and a conduit 16 with a suction pump (not shown) for holding the bottoms of cups against the chucks. Between each pair of bearings 6, a wheel 17 is rigidly mounted on the radial shaft and extends down through a slot in the table for periodic engagement with a friction wheel 18 below the table at the stroking station. The friction wheel is driven continuously by an electric motor 19 mounted on the base plate.

To apply cups to the chucks, each cup 21 is first fitted over a vacuum chuck 22 mounted on the outer end of a horizontal shaft 23 which can be reciprocated radially of the table in a housing 24 mounted on the base plate 3 beside the table 1. As soon as the cup is placed on the loading chuck, the chuck is moved toward the table to press the bottom of the cup against a chuck 8 at the loading station. At that moment, the suction at the loading chuck is cut off and the suction at the table chuck holds the cup while the loading chuck returns to its original position. The table is then indexed around until the cup reaches the stroking station, where the shaft wheel 17 comes into contact with the underlying friction wheel 18. The shaft and cup then are rotated by the friction wheel until stopped in a manner about to be described. When rotation of the cup is stopped, the friction wheel also will stop while a spring-pressed friction collar 26 on its drive shaft will slide against the wheel instead of turning it. Rotation of the cup is always stopped with its handle in a predetermined position ready for a stroke to be applied to it. After the stroke has been applied, the table is indexed again and the associated valve 12 is tripped to connect the table chuck with the atmosphere so that the cup will be released.

The stroking mechanism also is mounted on base plate 3. The stationary part of this mechanism includes a pair of vertical channels 29 which support a vertical plate 30, on the opposite side of which a large bracket 31 is mounted. The top of the bracket has a bifurcated outer end, in which a U-shaped member 32 is pivotally supported on horizontal pins 33. The outer end of this member likewise carries pivot pins 34 (Figs. 3 and 4), from the inner ends of which the top of a frame-like cam housing 36 is pivotally suspended. The U-shaped member is maintained more or less horizontal by an arm 37 that extends down from the center of its inner portion to a block 38 loosely mounted between stop collars 39 on a generally horizontal screw 41. The arm and block are pivotally connected together. The outer end of the screw carries a dial handle 42 for turning it, and the inner end of the screw is threaded in a nut 43 that is provided with an extension which is pivotally mounted on a horizontal pin 44 attached to the back of bracket 31. Consequently, when the screw is turned by the handle, the lower end of the arm is moved forward or back to raise or lower the cam housing. The lower end of the housing can be adjusted back and forth by another screw 46 rotatably mounted in a block 47 between stop collars 48 and pivoted on a pin 49 attached to the bottom of the housing. The inner end of this screw is threaded in a nut 51 supported by a horizontal pivot pin 52 attached to the back of the bracket.

A continuously driven drive shaft 53, including a universal joint and a telescoping section (not shown), extends up through the base plate 3 and is journaled at its upper end in a gear box 54 supported by the back of the cam housing at the outer side of bracket 31. Inside the gear box, as shown in Fig. 5, a bevel gear 55 is mounted on the shaft and meshes with a similar gear 56 on the rear end of a cam shaft 57. This cam shaft is journaled in bearings 58 and 59 fastened to the front and back of the housing. Mounted on the cam shaft inside the housing are two circular cams, one small and one large. The large cam 61 is provided with a grooved track 62 in which a cam follower roller 63 (Fig. 3) is disposed. This roller is mounted on the outer end of a radial arm 64 secured to a vertical bevel gear 66 having only a few teeth. The gear is journaled on a stub shaft 67 projecting inwardly from the front of the housing. The gear teeth mesh with a bevel pinion 68 mounted on a horizontal sleeve 69 extending perpendicularly to the cam shaft. The sleeve can be oscillated in bearings 71 and 72 supported by the cam housing, and it extends out of the end of the housing nearest to the table. A fork 73 is rigidly mounted on the projecting end of the sleeve. The shape of the cam track is such that the mutilated gear will be turned far enough to rotate the sleeve and fork about 120°, although greater or less rotation can be satisfactory.

The small cam 76 likewise has a grooved track 77, in which a cam follower roller 78 travels. This roller is supported by the inner end of a control rod 79 that is slidably mounted in sleeve 69. The rear end of the rod also supports a block 81 that slides back and fourth in a horizontal slot 82 in the back of the cam housing to prevent the rod from turning with the sleeve. The opposite end of the rod extends out of the sleeve and has a conical head 83 that extends under a roller 84, journaled on a small shaft 86 mounted in the opposite sides of an outer fork 87 that straddles the inner fork 73. The outer fork contains opposed pivot pins 88 and 88a which project into bearings 89 in the adjacent sides of the inner fork in order to support the outer fork.

The outer end of the outer fork supports one end of a rod-like arm 91, which, when pins 88 and 88a are horizontal, extends away from the forks in a vertical plane that is perpendicular to the axis of the radial shaft 7 on the table at the stroking station. Near the outer end of this arm, a positioning finger 92 (Fig. 3) extends down away from it in a location where it will be struck by the side of a cup handle when the cup is rotated at the stroking station. The position of the finger is such that it will stop the handle when it is substantially vertical. Just beyond this finger a barrel 93 is rotatably mounted on the arm. It is urged to rotate in one direction around the arm by means of a fine torsion spring 94, which likewise encircles the arm and has one end connected to the barrel and the other to a collar 96 secured to the end of the arm. Turning of the barrel by the spring is limited by a pin 97 which projects from the inner end of the barrel and strikes against another pin 98 projecting from the top of the arm. Encircling the central part of the barrel is a friction ring 99, while partly encircling the inner end of the barrel, is an applicator 100. This applicator, which is a resilient pad, is the size and shape of the stroke that is to be printed on the cup handle.

As shown in Fig. 5, the arm and barrel are counterbalanced by a counter-weight 102 secured to the inner end of outer fork 87. To control the pressure of the applicator against the cup handles, a torsion spring 103 encircles a hub 104 projecting laterally from the outer fork around pivot pin 88. One end of the spring is secured to the fork and the other end to a circular plate 106 rotatably mounted on the outer end of the pin. This plate is provided with a number of circumferentially spaced holes so that it can be turned to different positions to vary the tension on the spring and held in any one of those positions by a screw 107 extending through one of the holes and into the adjacent side of the inner fork.

In the operation of this machine, rotation of large cam 61 causes inner fork 73 to turn back and forth, 120° for example, to swing the applicator 100 from side to side, but the turning is interrupted at certain points in the cycle. Rotation of small cam 76 causes conical rod head 83 to move back and forth to raise and lower the applicator 100. Here again the movement is interrupted periodically as now will be explained by reference to Figs. 6 and 7. In those figures the solid line P represents the path of travel of the center of rotation of the applicator and barrel 93 when there is no cup on the chuck, and the small circles along the line are the locations of that center when the large cam has rotated the number of degrees specified by the degree numbers beside those circles. When inner fork 73 is horizontal as shown in the drawings and cone 83 is in its outermost position, arm 91 will be swung up and the applicator barrel will be in its highest position directly (360°) above the cup.

As cam 61 turns from 360° to 20°, the two forks 73 and 87 will remain stationary while the applicator is inked in a manner that will be described presently. The inner fork will then start to turn and simultaneously the cone 83 will start to be retracted, so that by the time the cams have turned 60° the center of the barrel will be at the 60° circle on line P. Turning of the forks and retraction of the cone with consequent lowering of the applicator continues until the cams have rotated 120°. The forks are now in the dotted line position A in Fig. 7, which is as far as they turn in that direction. While the cams contine to rotate another 50° or so, the forks remain in that position and the cone likewise remains stationary while a cup on the chuck at the stroking station is rotated until its handle strikes the side of the positioning finger 92 without interference from the applicator.

The cone 83 then is retracted the rest of the way to allow the applicator to swing in against the cup handle as indicated by the large solid circle in Fig. 6. If no cup were there, the center of the barrel would sink to the 210° circle. In either case, while the large cam rotates from its 210° position to 280° it turns the forks 73 and 87 from the A position back 120° to the B position in Fig. 7. During this turning of the forks the applicator 100 is rolled along the top of the cup handle to apply a stroke to it corresponding to the shape of the applicator. The rotatable mounting of barrel 93 on arm 91 permits relative movement between them so that the applicator will not slip against the handle. The movements of the arm and applicator during application of the stroke correspond to the movements of the human arm and hand in the manual process used heretofore.

As soon as the stroke is completed, cone 83 is moved outward again into engagement with the bottom of roller 84 to lift the applicator from the cup handle. By the time the large cam has turned 300°, it starts to turn the forks back toward horizontal position. The cone continues to advance at the same time and to swing the applicator upward to its highest point (360°), whereupon the cycle is repeated for stroking the next cup.

When the applicator is at the top of its path, the friction ring 99 on the barrel engages a rotating inking roller 110 driven continuously from a suitable drive shaft 111. The roller is mounted on the outer end of an arm 112 supported by the cam housing 36. The engagement of friction ring and roller causes the barrel 93 to be rotated so that it will be in motion both before and after the applicator engages the roller. This assures uniform application of color to the applicator, and prevents smearing and uneven wear of the applicator. As soon as the friction ring is separated from the roller, spring 94 returns the applicator to its normal position relative to arm 91, ready for applying a stroke to a cup handle.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. A cup handle stroking machine comprising a housing, a sleeve mounted in the housing and projecting laterally therefrom, means for oscillating the sleeve on its axis, an arm extending away from the outer end of the sleeve at an oblique angle, means pivotally connecting the arm and sleeve on a transverse axis, a control rod slidably mounted in the sleeve and projecting from its opposite ends, means in the housing for reciprocating the rod, means operatively connecting the outer end of the rod with the arm for swinging the arm on said transverse axis, an applicator mounted on the outer end of the arm, and means for supporting a cup beside the applicator with its handle pointed toward the applicator crosswise of the arm, whereby the arm can swing the applicator into contact with the handle and then the sleeve can swing the arm to cause the applicator to roll along the handle to print a stroke on it.

2. A cup handle stroking machine according to claim 1, including manually operable means for adjusting said housing vertically and horizontally.

3. A cup handle stroking machine according to claim 1, in which said operatively connecting means include a lifting member connected with the inner end of said arm and resting on a tapered outer end of said control rod.

4. A cup handle stroking machine comprising an oscillatable member, means for oscillating said member, an arm extending away from one end of said member at an oblique angle to its axis of rotation, means pivotally connecting the arm and said member on a transverse axis, means for swinging the arm on said transverse axis, an applicator mounted on the outer end of the arm, a handle-positioning member projecting laterally from the arm beside the applicator, means for supporting a cup beside the applicator, and friction means for rotating the cup-supporting means to swing the cup handle against the side of said positioning member after the arm has swung toward the cup, whereby the handle will be pointed toward the applicator and can receive a stroke therefrom when said oscillatable member swings the arm to roll the applicator along the handle.

5. A cup handle stroking machine comprising a housing, a sleeve mounted in the housing and projecting laterally therefrom, means for oscillating the sleeve on its axis, an arm extending away from the outer end of the sleeve at a oblique angle, means pivotally connecting the arm and sleeve on a transverse axis, a control rod slidably mounted in the sleeve and projecting from its opposite ends and having a tapered outer end, means in the housing for reciprocating the rod, a lifting member carried by the arm in engagement with said tapered rod end so that when the rod is moved outward it will swing the arm upward on said transverse axis, an applicator mounted on the outer end of the arm, means for supporting a cup below the applicator with its handle pointed upward crosswise of the arm, whereby the control rod can lower the applicator into contact with the handle and then the sleeve can swing the arm to cause the applicator to roll along the handle to print a stroke on it, and a spring urging the arm to swing downward on said transverse axis.

6. A cup handle stroking machine comprising a cup holder, an arm extending laterally away from a cup on the holder, a transverse pivot for the remote end of the arm, an applicator rotatably mounted on the cup end of the arm, means for limiting rotation of the applicator in one direction on the arm, a torsion spring resisting rotation of the applicator in the opposite direction, a rotating inker for frictionally engaging the applicator and rotating it in said opposite direction, means for swinging the arm on its pivot to move the inked applicator away from said inking means and toward said holder to engage the handle of the cup, and means for rolling the cup end of the arm laterally to roll the applicator along said handle in order to print a stroke on it.

7. A cup handle stroking machine comprising a housing, a sleeve mounted in the housing and projecting laterally therefrom, means for oscillating the sleeve on its axis, an arm extending away from the outer end of the sleeve at an oblique angle, means pivotally connecting the arm and sleeve on a transverse axis, a control rod slidably mounted in the sleeve and projecting from its opposite ends, means in the housing for reciprocating the rod, means operatively connecting the outer end of the rod with the arm for swinging the arm on said transverse axis, an applicator mounted on the outer end of the arm, means for supporting a cup beside the applicator with its handle pointed toward the applicator, whereby the arm can swing the applicator into contact with the handle and then the sleeve can swing the arm to cause the applicator to roll along the handle to print a stroke on it, means pivotally suspending said housing from its upper end on a horizontal axis parallel to said sleeve, means for adjusting the lower end of the housing forward and backward, means pivotally supporting said suspending means on a horizontal axis behind said first-mentioned horizontal axis, and means for adjusting the front of said suspending means up and down to raise and lower said housing.

8. A cup handle stroking machine comprising a housing, a continuously rotatable shaft journaled therein, a sleeve mounted in the housing and projecting laterally from it, an arm extending away from the outer end of the sleeve at an oblique angle, means pivotally connecting the arm and sleeve on a transverse axis, a control rod slidably mounted in the sleeve and projecting from its opposite ends, cam means rigidly mounted on said shaft, means operatively connecting said cam means with said sleeve and rod for oscillating the sleeve on its axis and for reciprocating the rod, means operatively connecting the outer end of the rod with the arm for swinging the arm on said transverse axis, an applicator mounted on the outer end of the arm, and means for supporting a cup beside the applicator with its handle pointed toward the applicator crosswise of the arm, whereby the arm can swing the applicator into contact with the handle and then the sleeve can swing the arm to cause the applicator to roll along the handle to print a stroke on it.

9. A cup handle stroking machine according to claim 8, in which said first-mentioned operatively connecting means include a cam follower roller connected to said rod, a gear and pinion operatively connected with said sleeve, and a cam follower roller for oscillating said gear and pinion.

10. A cup handle stroking machine comprising a housing, a substantially horizontal sleeve mounted in the housing and projecting laterally therefrom, an arm extending upwardly and outwardly away from the outer end of the sleeve at an oblique angle thereto, pivot means connecting the arm and sleeve on a transverse axis, means for oscillating the sleeve on its axis to turn said transverse axis between inclined positions on opposite sides of a vertical center line, a control rod slidably mounted in the sleeve and projecting from its opposite ends, means in the housing for reciprocating the rod, means operatively connecting the outer end of the rod with the arm for swinging the arm on said transverse axis, an applicator mounted on the outer end of the arm, means for supporting a cup beside the applicator with its handle pointed toward the applicator crosswise of the arm, whereby the arm can swing the applicator into contact with the handle and then the sleeve can swing the arm to cause the applicator to roll along the handle to print a stroke on it, and means connected with the housing end of the arm for controlling the pressure of the applicator against the handle.

11. A cup handle stroking machine comprising a cup holder, an arm having one end located at one side of the holder, a transverse pivot for said end of the arm, the free opposite end of the arm extending across the handle of a cup on the holder, a barrel rotatably mounted on the free end of the arm, an applicator carried by the barrel and extending part way around it, a friction ring encircling the barrel beside the applicator, a driven inking roller, means for swinging the arm on its pivot to move the applicator into engagement alternately with the inking roller and said cup handle, said friction ring being positioned to engage the inking roller and drive said barrel, and means for rolling the free end of the arm laterally to roll the applicator along said handle in order to print a stroke on it.

References Cited in the file of this patent

UNITED STATES PATENTS

| | | |
|---|---|---|
| 1,531,365 | Wigley | Mar. 31, 1925 |
| 1,718,047 | Hunker | June 18, 1929 |
| 2,368,648 | Dulken et al. | Feb. 6, 1945 |
| 2,427,874 | Pilson | Sept. 23, 1947 |